March 26, 1946.   W. FERRIS   2,397,343
AUTOMOTIVE DRIVE
Filed Nov. 18, 1940   3 Sheets-Sheet 1

INVENTOR.
WALTER FERRIS
BY
ATTORNEY.

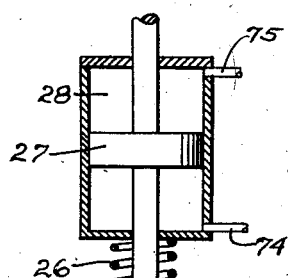
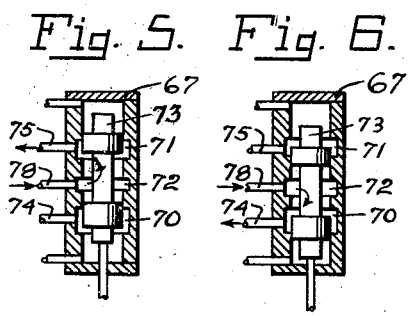
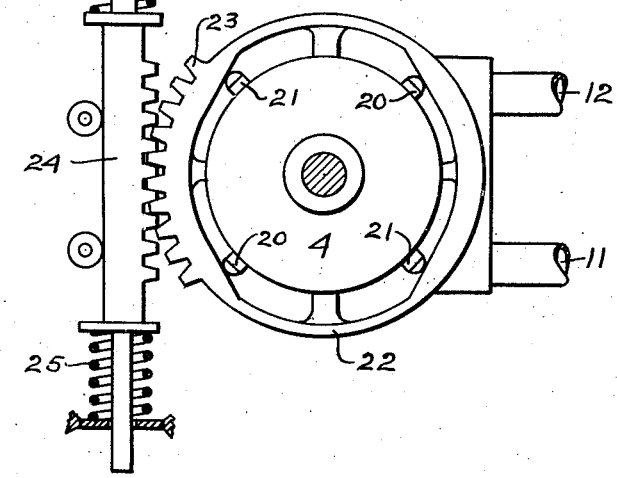
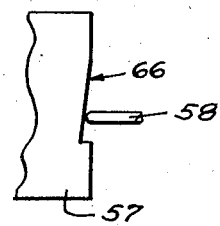
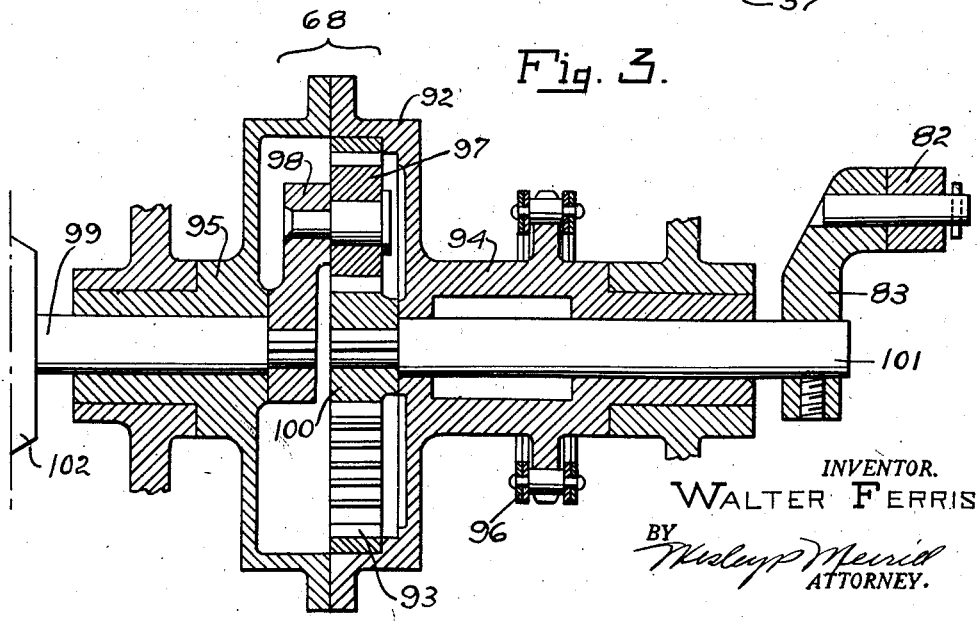

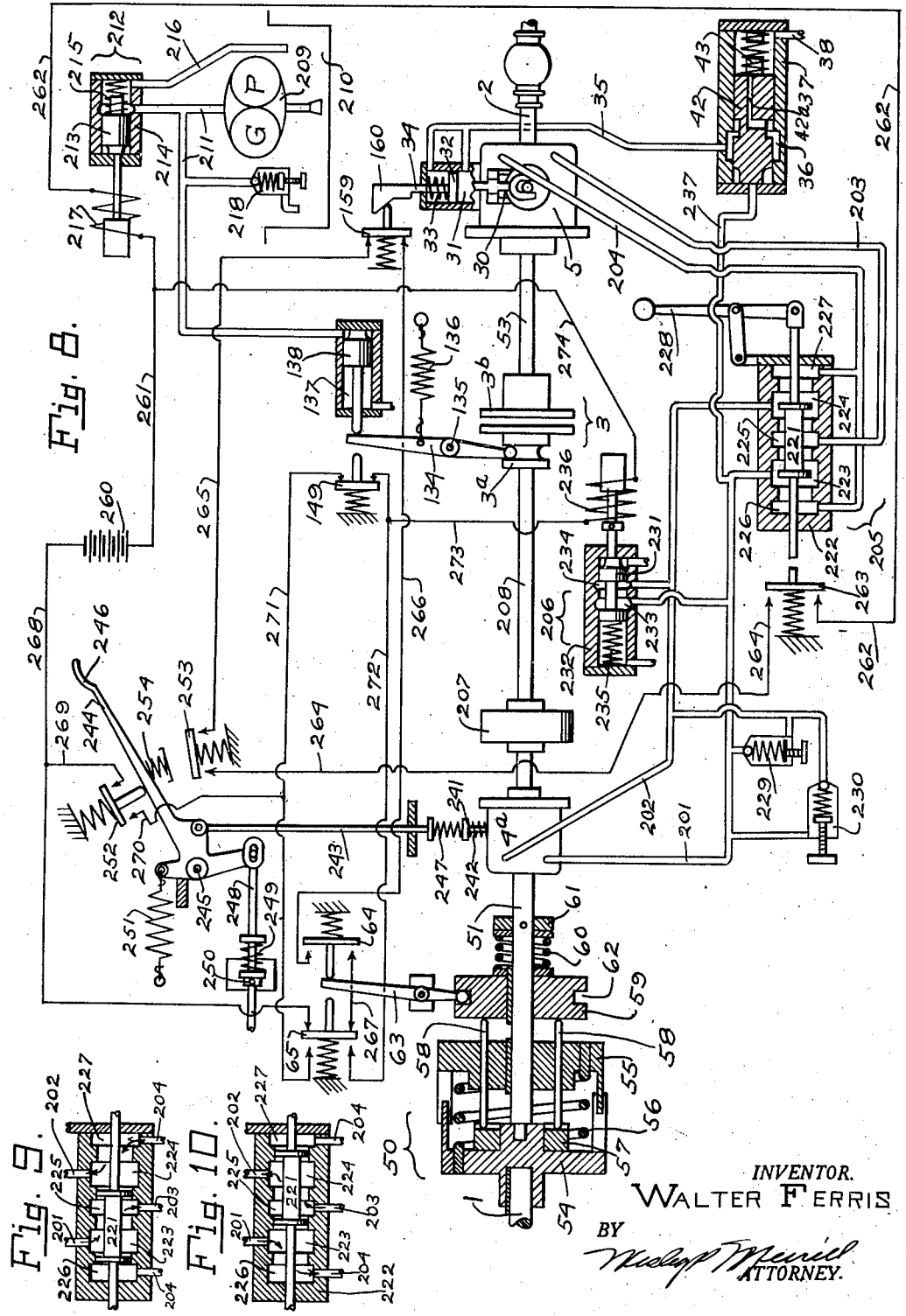

Patented Mar. 26, 1946

2,397,343

UNITED STATES PATENT OFFICE 2,397,343

AUTOMOTIVE DRIVE

Walter Ferris, Milwaukee, Wis., assignor to The Oilgear Company, Milwaukee, Wis., a corporation of Wisconsin Application November 18, 1940, Serial No. 366,061

20 Claims. (Cl. 60—53)

This invention relates to a drive of the type which includes a mechanical transmission for transmitting power from a prime mover to a shaft, a hydraulic transmission arranged in parallel with the mechanical transmission and including a pump driven by the prime mover and a motor energized by the pump and connected to the shaft to drive the same, and means for transferring the load from one transmission to the other to thereby simultaneously render one transmission effective and the other transmission ineffective to transmit power from the prime mover to the shaft, such as the drive shown in application S. N. 267,191 of which this application is a continuation in part and which has since matured into Patent No. 2,222,144.

The drive shown in the patent also includes means responsive to a variation in the relative speeds of the prime mover and the shaft for varying the relative displacements of the pump and the motor, to thereby cause the motor to drive the shaft at a speed having a predetermined ratio to the speed of the prime mover, and means for so controlling the transfer mechanism that the load is transferred from one transmission to the other only when the two transmissions are operating at the same ratios so that the load is transferred without shock.

The patented drive is shown applied to a motor vehicle, and the mechanical transmission is employed for connecting the propeller shaft thereof directly to the vehicle engine to obtain high speed operation of the vehicle. The speed ratio between the engine and the propeller shaft may be varied through either of the transmissions but it is intended that the hydraulic transmission be used for starting and accelerating the vehicle under ordinary operating conditions and that the mechanical transmission be used when an excessive torque must be transmitted to the propeller shaft, the reason being that the hydraulic motor is of the constant displacement type and, if the motor were large enough to start the vehicle under adverse conditions or to drive it up a steep grade when loaded, it would be necessary to provide the drive with a very large pump in order to obtain the desired speed range.

The present invention has as an object to provide a drive of the above character with means for automatically rendering one transmission ineffective and the other transmission effective to drive the shaft in response to the load on the shaft reaching a predetermined maximum.

Another object is to provide a drive of this character with a variable displacement motor and means for automatically increasing the displacement of the motor in response to an increase in the load thereon to thereby enable the motor to exert sufficient torque to drive the increased load.

Another object is to provide a drive of this character with a variable displacement motor and means for automatically varying the displacement of the motor in response to a variation in the load thereon to thereby enable the motor to drive a heavy load at a low speed or a lighter load at a higher speed without corresponding variations in the pressure or the rate of flow of the motive liquid supplied thereto.

Another object is to provide a drive which will cause a greater part of the available torque of an internal combustion engine to be utilized than is possible with any prior drive, thereby conserving a part of the fuel for the engine.

A drive constructed according to the present invention has the advantage of automatically providing stepless variations of speed ratios while accelerating the vehicle and while driving in heavy traffic, thereby avoiding the necessity of shifting gears to vary the speed ratios or to reverse the vehicle.

Other objects and advantages will appear from the following description of the embodiments of the invention shown schematically in the accompanying drawings in which the views are as follows:

Fig. 2 is a view showing mechanism for varying the displacement of the pump shown in Fig. 1.

Fig. 3 is a sectional plan view of the differential mechanism shown in Fig. 1.

Fig. 4 is a view showing a bypass valve in a position different from that shown in Fig. 1.

Figs. 5 and 6 are views showing a pilot valve in positions different from that shown in Fig. 1.

Fig. 7 is a developed view of a cam forming part of the torque responsive mechanism shown in Fig. 1.

Fig. 8 is a view showing a modification of the drive shown in Fig. 1.

Figs. 9 and 10 are views showing a reversing valve in positions different from that shown in Fig. 8.

Figure 1:
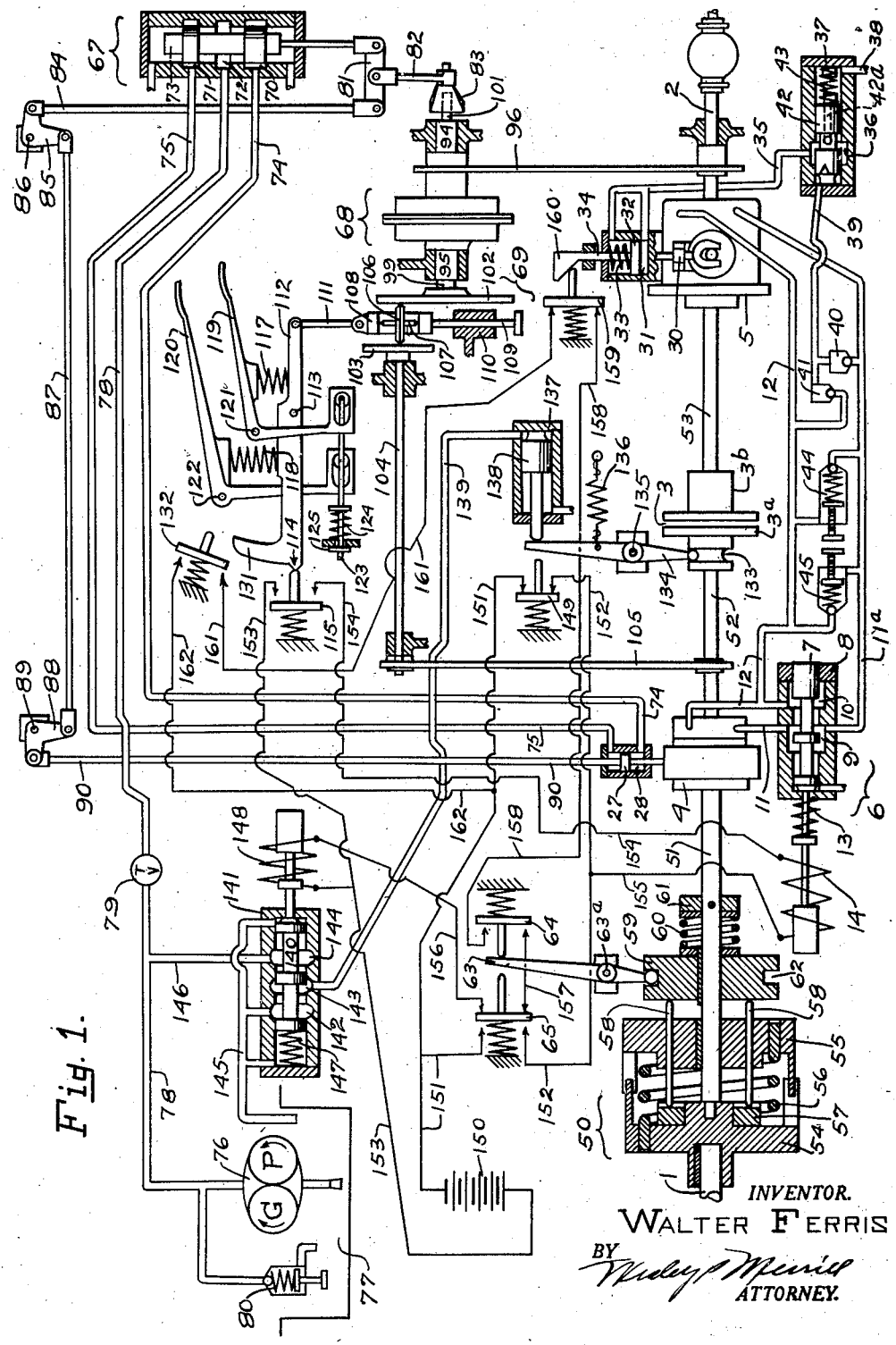
Fig. 1 is a diagrammatic view of an automotive drive in which the invention is embodied.

For the purpose of illustration, the invention has been shown embodied in a drive for an automotive vehicle of which, since it forms no part of the present invention, all parts have been omitted from the drawings except a part of a drive shaft 1, which is connected to and driven by the vehicle engine, and a part of the propeller shaft 2 through which motion is transmitted in the usual manner to and from the rear wheels through the usual differential not shown.

Figs. 1 to 7

Shaft 1 is adapted to drive shaft 2 through either a mechanical transmission, which consists primarily of a clutch 3 and suitable shafting for connecting the two parts of the clutch to shafts 1 and 2 respectively, and a hydraulic transmission 10 which consists primarily of a variable displacement pump 4 and a variable displacement hydraulic motor 5. Clutch 3 has been shown as being a friction clutch but a jaw or other type of clutch may be employed for the reason that 15 the two parts of the clutch are synchronized before the clutch is engaged as will presently be explained. Pump 4 may be unidirectional and motor 5 may be reversed through a valve but, for the purpose of illustration, pump 4 has been shown 20 as being reversible and adapted to be adjusted to zero displacement when the vehicle is idle and the hydraulic transmission includes a bypass valve 6 which operates automatically to bypass both the pump and the motor at all times except 25 when the vehicle is being driven through the hydraulic transmission.

As shown, bypass valve 6 has a valve member 7 arranged in a valve body 8 to control communication between two annular grooves or ports 9 30 and 10 formed therein. Port 9 is connected by a channel 11 to one side of pump 4 and by a channel 11ᵃ to one side of motor 5. Port 10 is connected by a channel 12 to the other side of pump 4 and to the other side of motor 5.

Valve member 7 is urged by a spring 13 to the position shown in Fig. 1, in which position port 9 is open to port 10 so that pump 4 and motor 5 are both by-passed, and it is adapted to be shifted by a solenoid 14 to the position shown in 40 Fig. 4 in which position communication between ports 9 and 10 is blocked and all of the liquid discharged by pump 4 is delivered to motor 5 and the liquid discharged by motor 5 is returned to pump 4.

Pump 4 and motor 5 may be of any suitable type but the shafts thereof should extend axially therethrough and it is desirable that each have a large capacity relative to its weight and overall dimensions such for example as a pump 50 and a motor of the types shown, respectively, in Fig. 9 and in Fig. 1 of Patent No. 2,141,171. Consequently, pump 4 and motor 5 have not been illustrated nor described in detail herein, it being deemed sufficient to state that pump 4 when 55 driven will discharge liquid at a rate and in a direction determined by the speed at which it is driven and by the distance and direction its displacement varying mechanism is adjusted from the neutral position thereof, and that motor 5 60 when supplied with liquid from pump 4 through one or the other of channels 11ᵃ and 12 will drive shaft 2 in one direction or the other at a rate determined by the displacement of motor 5 and by the rate at which pump 4 delivers liquid to 65 motor 5.

Referring now to Fig. 2, the displacement of pump 4 is varied by adjusting a pair of diametrically opposed abutments 20 and a pair of diametrically opposed abutments 21 which are urged 70 outward by the pumping forces and of which only the outer ends have been shown.

For the purpose of illustration, the outer ends of abutments 20 and 21 have been shown in contact with suitable cam faces formed upon the 75 inside of a cam ring 22 which is journaled upon the casing of pump 4. Ring 22 has a gear segment 23 arranged thereon and in mesh with a rack 24 which is urged by two springs 25 and 26 to a neutral position as shown and connected at its upper end to the tail rod of a piston 27 fitted in a stationary cylinder 28.

The arrangement is such that, when rack 24 is in its neutral position as shown, abutments 20 and 21 are in their intermediate positions and pump displacement is zero so that no liquid is delivered by pump 4. When liquid is supplied to the lower end of cylinder 28, piston 27 will raise rack 24 and cause it to rotate cam ring 22 in a clockwise direction, cam ring 22 will move abutments 21 inward and permit abutments 20 to move outward which will cause pump 4 to discharge liquid into channel 11 at a rate substantially proportional to the distance through which the abutments are moved. When liquid is supplied to the upper end of cylinder 28, piston 27 will move rack 24 downward and cause it to rotate cam ring 22 in a counterclockwise direction, cam ring 22 will move abutments 20 inward and permit abutments 21 to move outward which will cause pump 4 to discharge liquid into channel 12 at a rate substantially proportional to the distance through which the abutments were moved.

The displacement of a motor such as motor 5 is ordinarily varied by means of two hydraulic servo-motors arranged upon opposite sides thereof and connected directly to the displacement varying elements but, for the purpose of illustration, motor 5 has been shown as provided with a displacement varying mechanism of the type illustrated in Patent No. 2,222,144 to which reference may be had for a complete description thereof. It is deemed sufficient to state herein that motor 5 has its displacement varied by means of a servo-motor fixed to its casing and connected by suitable linkage 30 to its displacement varying elements.

As shown, the displacement varying servo-motor of motor 5 includes a cylinder 31 which is fixed to the casing of motor 5, a piston 32 which is fitted in cylinder 31, a spring 33 for urging piston 32 toward motor 5, and a piston rod 34 which is fixed to piston 32 and connected by means not shown to linkage 30. The arrangement is such that movement of piston 32 toward motor 5 will reduce motor displacement and movement of piston 32 away from motor 5 will increase motor displacement, the displacement of motor 5 being normally held at a predetermined minimum by spring 33.

Piston 32 is adapted to be moved outward to increase motor displacement in response to pump pressure exceeding a predetermined value. As shown, cylinder 31 has both ends thereof connected by a channel 35 to a port 36 formed in a valve casing 37 having the right end thereof connected to a drain channel 38 and the left end thereof connected to one end of a channel 39 the other end of which is connected to channels 11ᵃ and 12, respectively, through two check valves 40 and 41 which permit liquid to flow from either of those channels into channel 39 but prevent any flow of liquid from one to the other of channels 11ᵃ and 12. Communication between port 36 and channel 38 and between port 36 and channel 39 is controlled by a valve 42 which is fitted in valve casing 37 and urged toward the left by a spring 43. Valve 42 is reduced in diameter intermediate its ends and a restricted passage 42ᵃ extends from the reduced portion through the right end of the valve.

The arrangement is such that, when pump 4 creates sufficient pressure in channel 11ª or channel 12, liquid can flow therefrom through check valve 40 or check valve 41 and channel 39 to valve casing 37, move valve 42 toward the right against the resistance of spring 43, and then flow through valve casing 37 and channel 35 to cylinder 31 and act upon both faces of piston 32. Due to the displacement of rod 34, piston 32 has a greater effective pressure area upon its inner face than upon its outer face so that liquid acting upon piston 32 will move or tend to move it outward away from motor 5 and thereby increase or tend to increase the displacement of motor 5. When pump pressure drops, spring 43 will move valve 42 to the position shown in Fig. 1 and then spring 33 will move piston 32 inward to decrease the displacement of motor 5 and piston 32 will eject liquid from the lower end of cylinder 31 through channel 35, passage 42ª and valve casing 37 into drain channel 38.

Piston 32, rod 34 and springs 33 and 43 are so proportioned that spring 33 will hold motor 5 at a predetermined minimum displacement until pump pressure reaches a high value and then it will yield and permit piston 32 to move outward and increase the displacement of motor 5 as pump pressure continues to rise, the pressure created by pump 4 being limited by one or the other of two oppositely opening relief valves 44 and 45 shown connected between channels 11ª and 12.

In order to avoid sudden variations in the displacement of motor 5 responsive to momentary surges in working pressure and to prevent hunting of the displacement varying mechanism, passage 35 is sufficiently constricted to prevent a sudden inflow of oil to cylinder 33 and passage 42ª is still further constricted so that reductions in the displacement of motor 5 responsive to reductions in working pressure will occur more slowly than increases in displacement.

In order that the mechanical transmission may be rendered ineffective and the hydraulic transmission rendered effective to drive propeller shaft 2 in response to the load on shaft 2 reaching a predetermined maximum, drive shaft 1 is connected through a torque coupling 50 to one end of a shaft 51 through which both transmissions are driven. As shown, shaft 51 has its other end fixed to or formed integral with the shaft of pump 4 at one end thereof, the shaft of pump 4 has its other end fixed to or formed integral with a shaft 52 which has one part 3ª of clutch 3 splined thereon. The other part 3ᵇ of clutch 3 is fixed on one end of a shaft 53 which at its other end is fixed to or formed integral with the shaft of motor 5 at one end thereof, and the shaft of motor 5 at its other end is fixed to or formed integral with propeller shaft 2.

Torque coupling 50 has been shown as including a driving member 54 which is fixed upon drive shaft 1, a driven member 55 which is splined upon shaft 51 and a strong torsion spring 56 which is adjusted to have a substantial initial tension and connects member 55 to member 54 so that shaft 51 is driven from shaft 1 through spring 56. In order to maintain the initial tension in spring 56, members 54 and 55 are each provided with integral lugs which overlap the lugs of the other member and prevent the initial tension in spring 56 from causing driven member 55 to rotate relative to driving member 54 but permit driving member 54 to rotate relative to driven member 55 whenever the torque transmitted through coupling 50 is sufficient to cause spring 56 to yield.

Member 54 has a cam 57 fixed thereto or formed integral therewith and engaged by a plurality of small rods 58 which extend loosely through member 55 into engagement with a collar 59 splined upon shaft 51. Rods 58 are held in contact with cam 57 and with collar 59 by a spring 60 arranged around shaft 51 between collar 59 and an abutment 61 fixed upon shaft 51.

An annular groove 62 is formed in the periphery of collar 59 to receive one end of a lever 63 which is pivoted intermediate its ends upon a stationary pin 63ª and has its other end in engagement with a switch 64 to hold it open when collar 59 is in its initial position, that is, in the position occupied when the lugs on coupling members 54 and 55 are in engagement with each other. A slight axial movement of collar 59 will swing lever 63 sufficiently to permit switch 64 to close and a greater axial movement of collar 59 will swing lever 63 far enough to cause its free end to operate a switch 65.

The arrangement is such that, when drive shaft 1 is rotated, shaft 51 will be rotated through torque coupling 50 the spring 56 of which has its tension so adjusted that it will not yield until the torque transmitted therethrough is substantial but not as great as the torque motor 5 is able to exert when at minimum displacement, and then it will yield and permit driving member 54 to rotate relative to driven member 55 and cause cam face 66 (Fig. 7) on cam 57 to move rods 58 axially. Rods 58 will move collar 59 along shaft 51 and collar 59 will swing lever 63 upon pin 63ª. A very slight movement of lever 63 permits switch 64 to close. Whenever the torque reaches a high value, such as three-fourths of the available torque of the engine, spring 56 will yield sufficiently to enable rods 58 to move collar 59 far enough to cause lever 63 to operate switch 65 which will cause clutch 3 to be disengaged as will presently be explained.

The vehicle is started and driven through the hydraulic transmission as long as the torque required to drive the vehicle is less than the torque required to cause lever 63 to operate switch 64. When the torque becomes great enough to cause switch 64 to close and motor 5 is at its preset minimum displacement, clutch 3 will be engaged to render the mechanical transmission effective to drive the vehicle as will presently be explained.

In order that clutch 3 may be engaged without shock, motor 5 is adapted to have its speed regulated to thereby synchronize shaft 53 with shaft 52. This is accomplished by means of a control mechanism which adjusts the displacement of pump 4 to thereby regulate the speed of motor 5 in response to a variation in the relative speeds of pump 4 and motor 5.

As shown, the control mechanism includes a pilot valve 67 which controls the flow of motive liquid to and from pump control cylinder 28, a differential gear unit 68 which has one leg thereof driven through a suitable friction disk transmission 69 at a speed proportional to the speed of pump 4 and a second leg thereof driven at a speed proportional to the speed of motor 5 so that its third leg rotates in response to the speed of pump 4 or the speed of motor 5 departing from a preset ratio, means for opening pilot valve 67 in response to rotation of the third leg of differential 68, and follow-up mechanism which is operated in response to adjustment of the displacement of pump 4 and acts to close pilot valve 67 when the adjustment of pump displacement has resulted in correcting such departure from the preset ratio.

Pilot valve 67 has formed in its casing three annular grooves or ports 70, 71 and 72 communication between which is controlled by a valve member 73 which is closely fitted in the valve casing and so shaped that a slight movement thereof in one direction or the other will open port 72 to one or the other of ports 70 and 71.

Port 70 is connected by a channel 74 to the lower end of pump control cylinder 28. Port 71 is connected by a channel 75 to the upper end of cylinder 28. Port 72 is constantly supplied with motive liquid from a gear pump 76 which draws liquid from a reservoir 77 and discharges it into a channel 78 which is connected to port 72 and has connected therein a suitable choke or throttle valve 79 to limit the rate at which liquid is delivered to cylinder 28 to thereby limit the rate at which the displacement of pump 4 is increased or decreased in response to operation of pilot valve 67.

The liquid discharged by gear pump 76 in excess of requirements is exhausted through a relief valve 80 which enables gear pump 76 to maintain a constant pressure in channel 78. Gear pump 76 and reservoir 77 are shown separate from main pump 4 but in practice they are associated therewith, as shown in patent No. 2,222,144, so that gear pump 76 may readily be driven by the engine and pump 4 may draw liquid from reservoir 77 or be supercharged by gear pump 76 according to the usual practice.

Pilot valve member 73 has its stem connected to one end of a floating lever 81 which is connected intermediate its ends by a link 82 and a crank 83 to the third leg of differential 68 and has its other end connected to a follow-up mechanism which operates in response to adjustment of pump 4.

As shown, lever 81 is connected by a link 84 to one arm of a bell crank lever 85 which is pivoted upon a stationary pin 86. The other arm of lever 85 is connected by a link 87 to one arm of a bell crank lever 88 which is pivoted upon a stationary pin 89 and has its other arm connected by a link 90 to pump control piston 27.

The arrangement is such that, when operation of differential 68 causes valve member 73 to be shifted downward and open port 72 to port 70 as shown in Fig. 6, liquid from gear pump 76 will flow through channel 78, pilot valve 67 and channel 74 to the lower end of cylinder 28 and cause piston 27 to move upward and thereby cause pump 4 to deliver liquid into channel 11 at a rate determined by the distance piston 27 is moved from its neutral position. When operation of differential 68 causes pilot valve member 73 to be shifted upward as shown in Fig. 5, liquid from gear pump 76 will flow through channel 78, pilot valve 67 and channel 75 to the upper end of cylinder 28 and cause piston 27 to move downward and thereby cause pump 4 to deliver liquid into channel 12 at a rate determined by the distance piston 27 is moved from its neutral position.

As soon as pilot valve member 73 starts to move in one direction, piston 27 will start to move in the opposite direction and will move link 90 with it. Link 90 will swing lever 88 upon pin 89 and cause link 87 to swing lever 85 upon pin 86 which will cause link 84 to move in the same direction that valve member 73 moves, thereby tending to swing lever 81 upon link 82 so that the follow-up mechanism tends to close valve 67 as fast as differential 68 opens it. Consequently, valve 67 is closed as soon as the third leg of differential 68 ceases to rotate.

Differential 68 is provided with a case 92 (Fig. 3) which has an internal gear 93 fixed therein and two hollow hubs 94 and 95 arranged upon opposite ends thereof and journaled in suitable bearings carried in the frame of the vehicle. Hub 94 is connected by means of a suitable drive 96 to propeller shaft 2 so that differential case 92 is driven in unison with motor 5 and propeller shaft 2.

A planet pinion 97 meshes with internal gear 93 and is rotatably carried by a crank 98 fixed upon the inner end of a shaft 99 which is journaled in hub 95 and extends outward through the end thereof. Planet pinion 97 also meshes with a sun gear 100 fixed upon the inner end of a shaft 101 which is journaled in hub 94 and has crank 83 fixed upon the outer end thereof.

Differential case 92 and shaft 99 are adapted to be driven in the same direction and, when they are driven at speeds having the same ratio as the ratio of the differential gears, shaft 101 will remain stationary and pilot valve member 73 will remain in neutral position as shown in Fig. 1.

When the speed of differential case 92 decreases relative to the speed of shaft 99, sun gear 100 and shaft 101 will be rotated in the same direction that case 92 is rotated, thereby causing lever 83 to be swung downward and lower pilot valve member 73 if the vehicle is being driven forward or causing lever 83 to be swung upward to raise pilot valve member 73 if the vehicle is being driven rearward. In either case, shifting pilot valve member 73 will cause the displacement of pump 4 to be increased in the previously explained manner and enable pump 4 to deliver liquid at an increased rate to increase the speed of motor 5 until it is driving differential case 92 at a speed equal to the speed of shaft 99.

When the speed of case 92 increases relative to the speed of shaft 99, sun gear 100 and shaft 101 will be rotated in a direction opposite to that in which case 92 is rotated, thereby causing lever 83 to swing upward and raise pilot valve member 73 if the vehicle is being driven forward or causing lever 83 to swing downward to lower pilot valve member 73 if the vehicle is being driven rearward. In either case, shifting pilot valve member 73 will cause the displacement of pump 4 to be decreased in the previously described manner. Pump 4 will then deliver liquid at a decreased rate and cause the speed of motor 5 to be decreased until it is driving differential case 92 at a speed proportional to the speed of shaft 99.

As previously explained, shaft 99 is adapted to be driven through a friction disk transmission 69. As shown, transmission 69 has a driven disk 102 fixed upon the outer end of shaft 99, a driving disk 103 fixed upon a shaft 104 which is rotatably supported by the frame of the vehicle and connected by a suitable drive 105 to shaft 52 so that disk 103 is driven at a speed proportional to the speed of shaft 52, and a transfer disk 106 for transmitting motion from disk 103 to disk 102.

When transfer disk 106 engages driving disk 103 at the center thereof, it will not be rotated and motion will not be transmitted to driven disk 102. When disk 106 is moved downward or upward from its neutral position so that it engages disk 103 at a point spaced from the center thereof, it will be rotated by disk 103 and cause disk 102 to rotate. The speed of disk 102 relative to the speed of disk 103 is determined by the distance that disk 106 is spaced from the center of disk 103.

Transfer disk 106 has been shown as having an axle 107 fixed thereto and pivoted between suitable shoulders formed upon a slide 108 having a rod 109 fixed thereto and fitted in a guide 110 which is carried by the frame of the vehicle to guide slide 108 and to limit the movement thereof in each direction.

Disk 106 may be shifted away from the center of disk 103 in any suitable manner but it is desirable that bypass valve 6 be closed and the supply of fuel to the engine be increased simultaneously with the shifting of disk 106.

For the purpose of illustration, slide 108 has been shown connected by a link 111 to one end of a lever 112 which is pivoted intermediate its ends upon a pin 113 and provided at its other end with a cam 114 for controlling a switch 115 which controls solenoid 14.

Lever 112 is spring centered in the position shown and it is adapted to be rocked in one direction or the other upon pin 113 by motion transmitted thereto through one or the other of two springs 117 and 118 which engage lever 112 upon opposite sides of pin 113 and have the other ends thereof in engagement, respectively, with the horizontal arms of two bell crank levers 119 and 120 which are pivoted upon pins 121 and 122 respectively.

Levers 119 and 120 have the depending arms thereof connected by suitable pin and slot connections to a control rod 123 which controls the rate at which fuel is supplied to the engine. Rod 123 is urged by a spring 124 toward the right to reduce the flow of fuel to the engine, and its movement toward the right is limited as by means of a collar 125 so that the engine is supplied with fuel at a limited rate when the vehicle is stationary according to the usual practice.

The arrangement is such that, when one or the other of levers 119 and 120 is operated, spring 117 or 118 will rock lever 112 in one direction or the other, cam 114 will move out of engagement with switch 115 which will close and cause bypass valve 6 to be closed, link 111 will shift slide 108 to move disk 106 away from the center of disk 103 to effect operation of the pump control mechanism so that pump 4 will deliver liquid to motor 5 which will rotate propeller shaft 2, and at the same time the depending arm of the operated lever will move control rod 123 toward the left to increase the flow of fuel and thereby enable the engine to have sufficient torque to start the vehicle. After disk 106 has been moved to the limit of its movement as determined by guide 110, spring 117 or 118 will yield and permit lever 119 or 120 to be depressed farther to further increase the flow of fuel to the engine.

Lever 112 also has a cam 131 arranged thereon for operating a switch 132 just as slide 108 engages guide 110 which limits further movement thereof. Switch 132 is provided to prevent clutch 3 from being engaged before the vehicle has been accelerated to suitable speed for direct drive.

Clutch 3 has the part 3ª thereof provided with an annular groove 133 to receive one end of a lever 134 which is pivoted upon a stationary pin 135 and urged by a spring 136 in a direction to disengage clutch part 3ª from clutch part 3ᵇ. The other end of lever 134 is engaged by the stem of a servo-motor consisting primarily of a cylinder 137 and a piston 138 fitted in cylinder 137.

Liquid for operating servo-motor 137—138 is supplied to cylinder 137 through a channel 139 from gear pump 76 under the control of a valve 140 which is arranged in a casing 141 and controls communication between three annular grooves or ports 142, 143 and 144 formed in casing 141. Port 142 and both ends of casing 141 are connected to a drain channel 145 which discharges into reservoir 77, port 143 has channel 139 connected thereto, and port 144 is connected by channel 146 to gear pump supply channel 78. Valve 140 is urged toward the right to the position shown by a spring 147 and it is adapted to be moved toward the left by a solenoid 148 which is controlled in a manner to be presently described. When valve 140 is shifted toward the left, port 143 is opened to port 144 so that liquid from gear pump 76 can flow through channels 78 and 146, valve casing 141 and channel 139 to cylinder 137 and cause piston 138 to swing lever 134 upon pin 135. Lever 134 will move clutch part 3ª into engagement with clutch part 3ᵇ to connect shaft 52 to shaft 53 and at the same time it will open a switch 149 to cause bypass valve 6 to open as will presently be explained.

When valve 140 is shifted to the position shown, port 143 is opened to port 142 to destroy the pressure in cylinder 137. Spring 136 will then swing lever 134 in a direction to disengage clutch 3 and lever 134 will permit switch 149 to close and it will also move piston 138 toward the right and cause it to expel liquid from cylinder 137 through channel 139, valve casing 141 and channel 145 into reservoir 77.

*The electric circuit*

Current for energizing solenoids 14 and 148 is supplied by a battery 150 which has one of its terminals connected by conductor 151 to one of the normally open contacts of switch 65 and to one of the terminals of switch 149 the other terminal of which is connected by conductor 152 to the other normally open contact of switch 65.

The other terminal of battery 150 is connected by conductor 153 to one end of the winding of solenoid 148 and to one terminal of switch 115 the other terminal of which is connected by conductor 154 to one end of the winding of solenoid 14. The other end of the winding of solenoid 14 is connected by a conductor 155 to conductor 152.

Switch 65 has one of its normally closed contacts connected by a conductor 156 to the other end of the winding of solenoid 148 and its other normally closed contact connected by a conductor 157 to one terminal of switch 84 the other terminal of which is connected by a conductor 158 to one terminal of a switch 159 which is adapted to be closed in response to the displacement of motor 5 being reduced to a predetermined minimum such as by means of a cam 160 carried by stem 34 of stroke control servo-motor 31—32. The other terminal of switch 159 is connected by a conductor 161 to one terminal of switch 132 the other terminal of which is connected by a conductor 162 to conductor 151.

*Operation*

When the car is stationary and the engine is not running, the parts are in the positions shown in Fig. 1, the displacement of pump 4 is substantially zero and the displacement of motor 5 is at a predetermined minimum. When the engine is started, pumps 4 and 76 will be driven, any liquid discharged by pump 4 will be bypassed through valve 6, and pump 76 will discharge through relief valve 80 which will enable pump 76 to maintain pressure in channel 78.

To start the vehicle moving forward, lever 119 is gradually depressed. During the first part of its movement, lever 119 will rock lever 112 through a small angular distance and it will move control rod 123 a short distance toward the left to increase the flow of fuel to accelerate the engine and to enable it to have greater torque. Lever 112 will move transfer disk 106 a short distance below the center of disk 103 and switch 115 will close.

Closing switch 115 establishes a circuit (150— 153—115—154—14—155—152—149—151—150) to energize solenoid 14 which will shift bypass valve member 7 toward the right to the position shown in Fig. 4.

Since shaft 52 is rotating and driving disk 103 and since shaft 2 is stationary, moving disk 106 downward will cause differential 68 to be driven and to move pilot valve member 73 downward as shown in Fig. 6. Liquid from gear pump 76 will then flow through channel 78, pilot valve 67 and channel 74 to the lower end of cylinder 28 and cause piston 27 to adjust pump 4 to cause it to discharge liquid into channel 11 as previously explained.

Shifting valve member 7 causes the liquid discharged by pump 4 to flow through channel 11, bypass valve 6 and channel 11ᵃ to motor 5 and to cause it to tend to rotate propeller shaft 2. If motor 5 when at its minimum displacement is able to exert sufficient torque to start the vehicle, it will do so but the torque required to start the vehicle is sometimes greater than the torque motor 5 is able to exert when its displacement is minimum in which case pump pressure rises, extends through check valve 40 and channel 39 and shifts valve 42 and then flows through channel 35 to cylinder 31 and causes piston 32 to increase the displacement of motor 5, the liquid discharged by pump 4 in excess of the volume required to operate piston 32 being exhausted momentarily through high pressure relief valve 44.

Adjusting motor 5 to increase its displacement enables it to have sufficient torque to start the vehicle and, in order that it may be started gradually, the rate at which it is accelerated is limited as by means of throttle valve 79 which limits the flow of liquid to cylinder 28 and thereby limits the rate at which the displacement of pump 4 is increased.

As previously explained, the torque required to cause torque coupling 50 to yield and permit switch 64 to close is less than the torque motor 5 is able to exert when its displacement is minimum so that switch 64 closes before the displacement of motor 5 starts to increase but closing switch 64 has no effect at this time for the reason that switch 132 is open and, as soon as the displacement of motor 5 starts to increase, cam 160 will permit switch 159 to open and thereby prevent clutch 3 from being engaged until the displacement of motor 5 is again reduced to the predetermined minimum and switch 159 is again closed.

During continued downward movement of lever 119, the flow of fuel to the engine is increased, disk 106 moves downward until further movement thereof is arrested by slide 108 engaging guide 110, and cam 131 closes switch 132 to close one gap in a circuit for effecting engagement of clutch 3 as will presently be explained. After slide 108 engages guide 110, spring 117 will yield and permit lever 119 to be depressed farther to further increase the flow of fuel to the engine.

As soon as the vehicle starts to move, less torque is required to keep it moving so that the pressure drops slightly and permits spring 33 to reduce the displacement of motor 5 and thereby cause motor 5 to increase the speed of propeller shaft 2 relative to the engine speed. As the vehicle continues to accelerate, spring 33 will continue to reduce the displacement of motor 5 and thereby cause motor 5 to accelerate shafts 2 and 53 until the displacement of motor 5 has been reduced to the preset minimum.

Since any hydraulic transmission has as an inherent characteristic thereof a certain amount of slip or leakage, pump 4 and motor 5 are so proportioned that, when pump 4 is at its maximum displacement and motor 5 is at its preset minimum displacement and is exerting its greatest torque at that displacement, the liquid discharged by pump 4 will be somewhat in excess of the liquid required to drive motor 5 at the same speed at which pump 4 is being driven. Consequently, the liquid discharged by pump 4 when at maximum displacement will cause motor 5 when at minimum displacement to tend to run faster than pump 4. However, guide 110 is so located that it will stop transfer disk 106 in the correct position to cause differential 68 to operate pilot valve 67 and thereby effect an adjustment of the displacement of pump 4 in response to the speeds of pump 4 and motor 5 varying one from the other. Therefore, an increase in the speed of motor 5 above the speed of pump 4 will result in the displacement of pump 4 being decreased to thereby maintain the speed of motor 5 and shafts 2 and 53 exactly the same as the speed of pump 4 and shaft 52 as previously explained.

When the displacement of motor 5 has been reduced to the preset minimum, cam 160 will close switch 159 to establish a circuit (150—151— 162—132—161—159—158—64—157—65 — 156 — 148—153—150) to energize solenoid 148 which will shift valve 140 toward the left and thereby permit gear pump liquid to operate servo-motor 137—138 which will cause lever 134 to engage clutch 3 and open switch 149. Since shafts 52 and 53 are rotating at the same speed, clutch 3 will be engaged without any shock or slippage.

Opening switch 149 will deenergize solenoid 14 to permit spring 13 to shift bypass valve member 7 to the position shown in Fig. 1, thereby bypassing pump 4 and motor 5 simultaneously with the engagement of clutch 3 so that the vehicle is then driven solely through the mechanical transmission. The speed of the vehicle is then controlled by operating lever 119 to vary the flow of fuel to the engine according to the usual practice.

If, when the vehicle is being driven through the mechanical transmission the torque required to drive the vehicle should become nearly as high as the available torque of the engine, torque coupling 50 would yield and cause lever 63 to operate switch 65 to disconnect conductor 156 from conductor 157 and to connect conductor 152 to conductor 151.

Connecting conductor 152 to conductor 151 establishes a circuit (150—151—65—152—155— 14—154—115—153—150) to energize solenoid 14 which will close bypass valve 6 so that the liquid discharged by pump 4 is directed to motor 5, thereby rendering the hydraulic transmission effective to drive the vehicle.

Disconnecting conductor 156 from conductor 157 deenergizes solenoid 148 and permits spring 147 to shift valve 140 toward the right to open cylinder 137 to drain so that spring 136 can operate lever 134 to disengage clutch 3, thereby rendering the mechanical transmission ineffective to drive the vehicle. Operating lever 134 permits switch 149 to close and establish a circuit (150—151—149—152—155—14—154—115—153—150) to keep solenoid 14 energized and bypass valve 6 closed.

The hydraulic transmission will then function in the above described manner, the displacement of motor 5 being increased from its minimum when necessary to enable it to have sufficient torque to drive the vehicle. Increasing the displacement of motor 5 reduces the load on the engine which permits torque coupling 50 to return to its initial position and cause lever 63 to release switch 65 which will also return to its normal position.

Releasing switch 65 has no effect for the reason that switch 159 opened when the displacement of motor 5 was increased and switch 149 closed when lever 134 disengaged clutch 3.

Power for driving the vehicle will continue to be transmitted through the hydraulic transmission until the torque required to rotate shaft 2 drops sufficiently to cause the control mechanism to function in the above described manner to render the hydraulic transmission ineffective and the mechanical transmission effective to drive the vehicle.

To effect rearward movement of the vehicle when it is stationary and the engine is running, lever 120 is depressed. Lever 120 through spring 118 will rock lever 112 in a counterclockwise direction, lever 112 will raise disk 106 above the center of disk 103 and move cam 114 downward to permit switch 115 to close and thereby cause bypass valve 6 to close as previously explained, and the depending arm of lever 120 will shift control rod 123 toward the left to increase the flow of fuel to the engine.

Since pump 4 and shaft 52 are at all times driven in the same direction when the engine is running, raising disk 106 above the center of disk 103 enables disk transmission 69 to drive differential unit 68 in a direction to cause crank 83 to move pilot valve member 73 upward to open port 71 to port 72 as shown in Fig. 5.

Liquid from gear pump 76 may then flow through channel 78, pilot valve 67 and channel 75 to the upper end of pump control cylinder 28 and move piston 27 downward to cause pump 4 to deliver liquid through channel 12 to motor 5 to energize it, and pressure will rise and cause servo-motor 31—32 to increase motor displacement until motor 5 has sufficient torque to rotate shaft 2 as previously explained. Then the liquid discharged by pump 4 will cause motor 5 to drive the vehicle rearward.

Throttle valve 79 limits the rate at which liquid is delivered to control cylinder 28 and thereby causes pump 4 to deliver liquid to motor 5 at a rate that gradually increases from zero so that motor 5 is enabled to slowly start the vehicle and to move it rearward at a gradually increasing speed. The vehicle may be accelerated by depressing lever 120 farther.

As soon as propeller shaft 2 starts rotating to move the vehicle rearward, drive 96 will rotate the case 92 of differential 68 in a direction to cause crank 83 to tend to move pilot valve member 13 downward so that pilot valve 67 is closed and further adjustment of pump 4 ceases as soon as shaft 2 has reached a speed bearing a certain ratio to the speed of pump 4 as determined by the adjustment of disk 106.

*Figs. 8–10*

The drive shown in Fig. 8 includes both a mechanical transmission and a hydraulic transmission for transmitting motion from engine shaft 1 to propeller shaft 2 the same as the drive shown in Fig. 1, but it differs primarily from that drive in that it is provided with an over-running clutch instead of with the differential mechanism for synchronizing the speed of the pump and the speed of the motor. Also, in order to show that it is not necessary to employ a pump of the reversible type, Fig. 8 shows the drive provided with a unidirectional pump and a reversing valve for reversing the motor. These two changes in the drive necessitate certain changes in the control mechanism but, since certain parts of the drive are the same as the corresponding parts of the drive shown in Fig. 1, like parts have been indicated by like reference numerals and further detailed description thereof will not be given.

As shown, the hydraulic transmission consists primarily of a variable delivery unidirectional pump 4ª which is adapted to discharge liquid into a channel 201 and have liquid returned to it through a channel 202, a variable displacement hydraulic motor 5 which is adapted to be energized by liquid supplied thereto through one or the other of two channels 203 and 204, a manually operable reversing valve 205 for connecting channels 201 and 202 to channels 203 and 204 selectively to thereby cause the liquid discharged by pump 4ª to drive motor 5 in one direction or the other, and an automatically operated bypass valve 206 for bypassing both the pump and the motor.

Both the mechanical and the hydraulic transmission are driven from engine shaft 1 through a torque coupling 50 which will yield and operate a lever 63 to permit a switch 64 to close only when a substantial torque is transmitted therethrough and which will yield sufficiently to cause lever 63 to operate a switch 65 when the torque transmitted therethrough is nearly as high as the available torque of the engine as previously explained.

The shaft 51 of coupling 50 is connected to one end of the shaft of pump 4ª the other end of which is connected to the driving member of an over-running clutch 207. The driven member of clutch 207 is connected by a shaft 208 to one part 3ª of clutch 3 the other part 3ᵇ of which is connected by a shaft 53 to one end of the shaft of motor 5, the other end of the shaft of motor 5 being connected to propeller shaft 2. Except for clutch 207, the mechanical transmission is exactly the same as the mechanical transmission shown in Fig. 1.

Clutch 3 is adapted to be operated by a lever 134 which is urged in a direction to disengage clutch 3 by a spring 136 and is adapted to be swung by a servo-motor 137—138 in a direction to engage clutch 3 and to simultaneously open a switch 149 the same as in the drive shown in Fig. 1.

Liquid for operating servo-motor 137—138 is supplied by a gear pump 209 which draws liquid from a reservoir 210 and discharges it into a branched channel 211 having one branch thereof connected to a bypass valve 212 and another branch thereof connected to cylinder 137.

Valve 212 has a valve member 213 arranged in a casing 214 and normally held by a spring 215 in a position to maintain communication between channel 211 and a channel 216 which discharges into reservoir 210. Valve 212 is adapted to be shifted toward the right by a solenoid 217 to block communication between channels 211 and 216 and thereby cause the liquid discharged by gear pump 209 to flow through channel 211 to cylinder 137 and cause piston 138 to operate lever 134. After piston 138 reaches the end of its stroke, the liquid discharged by gear pump 209 is exhausted through a relief valve 218.

Reversing valve 205 has a valve member 221 arranged in a valve casing 222 to control communication between five annular grooves or ports 223, 224, 225, 226 and 227 formed in the inner wall of casing 222. Ports 223 and 224 have channels 201 and 202 connected thereto respectively, port 225 has channel 203 connected thereto, and ports 226 and 227 have channel 204 connected thereto. Valve member 221 is adapted to be shifted from the position shown in Fig. 8 to the position shown in Fig. 9 or to the position shown in Fig. 10 by a lever 228 which is connected to the stem thereof.

When valve member 221 is in the position shown in Fig. 8, pump 4ª and motor 5 are both bypassed. When valve member 221 is shifted to the position shown in Fig. 9, liquid discharged by pump 4ª into channel 201 will flow through valve 205 and channel 203 to motor 5 and cause it to drive the vehicle forward, the liquid exhausted from motor 5 being returned through channel 204, valve 205 and channel 202 to pump 4ª. When valve member 221 is shifted to the position shown in Fig. 10, liquid discharged by pump 4ª into channel 201 will flow through valve 205 and channel 204 to motor 5 and cause it to drive the vehicle rearward, the liquid exhausted from motor 5 being returned through channel 203, valve 205 and channel 202 to pump 4ª.

The pressure created by pump 4ª is limited by a relief valve 229 shown connected between channels 201 and 202. When the vehicle overruns the engine and causes motor 5 to discharge liquid faster than pump 4ª can take it, the liquid discharged by motor 5 in excess of the liquid required to supply pump 4ª is exhausted through a relief valve 230 which functions as a brake and has been shown connected between channels 202 and 201.

Bypass valve 206 has a valve member 231 arranged in a valve casing 232 to control communication between two ports 233 and 234 which are formed in valve casing 232 and connected, respectively, to channels 201 and 202. Valve member 231 is normally urged by a spring 235 to the position shown, in which position port 233 is open to port 234 so that any liquid discharged by pump 4ª will flow through channel 201, valve 206 and channel 202 back to the pump. Valve member 231 is adapted to be moved by a solenoid 236 toward the left to block communication between ports 233 and 234 and thereby cause any liquid discharged by pump 4ª to be directed to motor 5 providing reversing valve member 221 is in the position shown in Fig. 9 or Fig. 10.

Motor 5 and the controls associated therewith are the same as shown in Fig. 1. Briefly, the displacement of motor 5 is yieldingly held at a preset minimum and is increased in response to pump pressure exceeding a predetermined maximum by liquid supplied through a channel 35 to a servo-motor 31—32 under the control of a pressure responsive valve 42 the casing 37 of which is connected at one end to a drain channel 38 and its other end to channel 201 by a channel 237, and the rod 34 of servo-motor 31—32 carries a cam 160 for operating switch 159 as previously explained.

Pump 4ª may be of the type shown in Fig. 1 of Patent No. 2,141,171 and have its displacement controlled by an actuator 241 which is normally urged to zero position as by means of a spring 242. Actuator 241 is adapted to be moved in a direction to increase pump displacement by a rod 243 pivoted upon and reciprocable by a bell crank lever 244 which is pivoted upon a stationary pin 245 and has a pedal 246 on one end thereof. In order that pedal 245 may be depressed farther after actuator 241 has increased the displacement of pump 4ª to maximum, a spring 247 is interposed between actuator 241 and rod 243.

The depending arm of lever 244 is connected by a suitable pin and slot connection to a control rod 248 which controls the rate at which fuel is supplied to the engine. Rod 248 is urged by a spring 249 toward the right to reduce the flow of fuel to the engine, and its movement toward the right is limited as by means of a collar 250 so that the engine is supplied with fuel at a limited rate when the vehicle is stationary according to the usual practice. Lever 244 is urged upward to the position shown by a spring 251 in which position it holds a switch 252 open.

The arrangement is such that a very slight downward movement of pedal 246 will permit switch 252 to close and cause solenoid 236 to be energized and close bypass valve 206 as will presently be explained and continued gradual downward movement of pedal 246 will cause rods 243 and 248 to be gradually shifted. Rod 243 will gradually adjust pump 4ª which will deliver liquid at an increasing rate to motor 5 to cause it to start and accelerate the vehicle. Rod 248 will gradually increase the flow of fuel to the engine to enable it to have sufficient torque to start the vehicle.

After pedal 246 has been depressed a short distance, lever 244 will close a switch 253 which will permit the mechanical transmission to be rendered ineffective and the hydraulic transmission effective to drive the vehicle when switch 65 is operated as will presently be explained. In order that pedal 246 may be depressed farther after switch 253 is closed, yielding means are provided such as a spring 254 carried by lever 244 and adapted to engage switch 253.

*The electric circuit*

Current for energizing solenoids 217 and 236 is supplied by a battery 260 which has one of its terminals connected by a conductor 261 to one end of the winding of solenoid 217 the other end of which is connected by a conductor 262 to one terminal of a switch 263 which is closed by reversing valve member 221 when it is shifted to the position shown in Fig. 9 to cause the hydraulic transmission to drive the vehicle forward.

The other terminal of switch 263 is connected by a conductor 264 to one terminal of switch 253 the other terminal of which is connected by a conductor 265 to one terminal of switch 159. The other terminal of switch 159 is connected by a conductor 266 to one terminal of switch 64 the other terminal of which is connected by a conductor 267 to one of the normally closed contacts of switch 65. The other normally closed contact of switch 65 is connected to the other terminal of battery 260 by a conductor 268 which is also connected by a conductor 269 to one terminal of switch 252.

The other terminal of switch 252 is connected by a conductor 270 to a conductor 271 which connects one terminal of switch 149 to one of the normally open contacts of switch 65. The other terminal of switch 149 is connected by a conductor 272 to the other normally open contact of switch 65. Conductor 272 is connected by a conductor 273 to one end of the winding of solenoid 236 the other end of which is connected by a conductor 274 to conductor 261.

Operation

When the car is stationary and the engine is idle, the parts are in the positions shown in Fig. 8, the displacement of pump 4ª is substantially zero and the displacement of motor 5 is at a predetermined minimum. When the engine is started, pumps 4ª and 209 will be driven, any liquid discharged by pump 4ª will be bypassed through valve 206, and pump 209 will discharge through valve 212 and channel 216 in reservoir 210. To start the vehicle moving forward, lever 228 is moved rearward to shift reversing valve member 221 to the position shown in Fig. 9 and pedal 246 is depressed. Valve member 221 will close switch 263 and will connect channel 201 to channel 203 and channel 202 to channel 204.

During the first part of the movement of pedal 246, lever 244 will permit switch 252 to close and establish a circuit (260—268—269—252—270—271—149—272—273—236—274—261—260) to energize solenoid 236 which will operate bypass valve 206 to close communication between channels 201 and 202.

Lever 244 during the first part of its movement will also slightly depress rod 243 to operate the displacement varying mechanism of pump 4ª and thereby cause pump 4ª to deliver liquid at a limited rate through channel 201, reversing valve 205 and channel 203 to motor 5 to energize it. If motor 5 when at its minimum displacement is able to exert sufficient torque to start the vehicle, it will do so but the torque required to start the vehicle is ordinarily greater than the torque motor 5 is able to exert when its displacement is at minimum in which case pump pressure rises, extends through channel 237 and shifts valve 42 and then flows through channel 35 to cylinder 31 and causes piston 32 to increase the displacement of motor 5, the liquid discharged by pump 4 in excess of the volume required to operate piston 32 being exhausted momentarily through high pressure relief valve 229.

Adjusting motor 5 to increase its displacement enables it to have sufficient torque to start the vehicle and, since pump 4ª is delivering liquid to motor 5 at a very limited rate, the vehicle is started gradually whether or not the stroke of motor 5 be increased as described.

As previously explained, the torque required to cause torque coupling 50 to yield and permit switch 64 to close is less than the torque motor 5 is able to exert when its displacement is minimum so that switch 64 closes before the displacement of motor 5 starts to increase but closing switch 64 has no effect at this time for the reason that switch 253 is open and, as soon as the displacement of motor 5 starts to increase, cam 160 will permit switch 159 to open and thereby prevent clutch 3 from being engaged until the displacement of motor 5 is again reduced to a predetermined minimum and switch 159 is again closed.

During further downward movement of pedal 246, lever 244 will shift control rod 245 toward the left to increase the flow of fuel to the engine, it continues to move rod 243 to increase the displacement of pump 4ª and thereby increase the speed of motor 5, and it also closes switch 253 to close one gap in the circuit through solenoid 217. After the displacement of pump 4ª has been increased to maximum and after switch 253 is closed, springs 247 and 254 permit pedal 246 to be depressed farther to further increase the flow of fuel to the engine.

As soon as the vehicle starts to move, less torque is required to keep it moving so that the pressure drops slightly and, if motor displacement has previously been increased, the reduction in pressure permits spring 33 to reduce the displacement of motor 5 and thereby cause motor 5 to increase the speed of propeller shaft 2 relative to the engine speed. As the vehicle continues to accelerate, spring 33 will continue to reduce the displacement of motor 5 and thereby cause motor 5 to accelerate shafts 2 and 53 until the displacement of motor 5 has been reduced to the preset minimum.

When the displacement of motor 5 has been reduced to the preset minimum, cam 160 will close switch 159 to establish a circuit (260—268—65—267—64—266—159—265—253—264—263—262—217—261—260) to energize solenoid 217 which will close valve 212 and thereby cause the liquid discharged by pump 209 to flow through channel 211 and operate servo-motor 137—138 which will swing lever 134 upon pin 135. Lever 134 will engage clutch 3 to render the mechanical transmission effective to drive the vehicle and it will operate switch 149 to deenergize solenoid 236 and permit bypass valve 206 to open so that pump 4ª and motor 5 are bypassed and the hydraulic transmission thereby rendered ineffective to drive the vehicle.

Pump 4ª and motor 5 are so proportioned that, when pump 4ª is at its maximum displacement and motor 5 is at its preset minimum displacement, the liquid discharged by pump 4ª will be slightly in excess of the liquid required to drive motor 5 at the same speed at which pump 4ª is being driven. Consequently, the liquid discharged by pump 4ª when at maximum displacement will cause motor 5 when at minimum displacement to tend to run slightly faster than pump 4ª. Therefore, when clutch 3 is engaged, shaft 208 and the driven member of over-running clutch 207 will be driven faster than the shaft of pump 4ª and the driving member of over-running clutch 207. Then when bypass valve 206 is opened, which occurs almost simultaneously with the engagement of clutch 3, shaft 208 can pick up the load through clutch 207 and thereby enable the engine to drive the vehicle through the mechanical transmission.

If, when the vehicle is being driven through the mechanical transmission the torque required to drive the vehicle should become nearly as high as the available torque of the engine, torque coupling 50 would yield and cause lever 63 to operate switch 65 to disconnect conductor 267 from conductor 266 and to connect conductor 272 to conductor 271.

Connecting conductor 272 to conductor 271 establishes a circuit (260—268—269—252—270—271—65—272—273—236—274—261—260) to energize solenoid 236 which will close bypass valve 206 so that the liquid discharged by pump 4ª is delivered to motor 5, thereby rendering the hydraulic transmission effective to drive the vehicle.

Disconnecting conductor 267 from conductor 268 deenergizes solenoid 217 and permits bypass valve 212 to open and bypass pump 209 and to connect cylinder 137 to drain so that spring 136 can operate lever 134 to disengage clutch 3, thereby rendering the mechanical transmission ineffective to drive the vehicle. Operating lever 134 permits switch 149 to close and establish a circuit (260—268—269—252—270 — 271 — 149 — 272 — 273—236—274—261—260) to keep solenoid 236 energized and bypass valve 206 closed.

The hydraulic transmission will then function in the above described manner, the displacement of motor 5 being increased from its minimum when necessary to enable it to have sufficient torque to drive the vehicle. Increasing the displacement of motor 5 reduces the load on the engine which permits torque coupling 50 to return to its initial position and cause lever 63 to release switch 65 which will also return to its normal position.

Releasing switch 65 has no effect for the reason that switch 159 opened when the displacement of motor 5 was increased and switch 149 closed when lever 134 disengaged clutch 3.

Power for driving the vehicle will continue to be transmitted through the hydraulic transmission until the torque required to rotate shaft 2 drops sufficiently to cause the control mechanism to function in the above described manner to render the hydraulic transmission ineffective and the mechanical transmission effective to drive the vehicle.

To effect rearward movement of vehicle when it is stationary and the engine is running, lever 228 is moved forward to shift reversing valve member 221 to the position shown in Fig. 10 and pedal 246 is depressed. The vehicle will then be driven rearward through the hydraulic transmission which will function in the above described manner except that the liquid discharged by pump 4ª will flow through channel 201, reversing valve 205 and channel 204 to motor 5 and cause motor 5 to rotate in a direction opposite to that in which it operates when driving the vehicle forward. Clutch 3 cannot be engaged when the vehicle is moving rearward for the reason that switch 263 remains open until valve member 221 is shifted to effect forward movement of the vehicle.

The invention herein set forth is susceptible of various modifications and adaptations without departing from the scope thereof as hereafter claimed.

The invention is hereby claimed as follows:

1. In a drive for transmitting motion from an engine to a shaft, the combination of a mechanical transmission having one part thereof driven by said engine and another part thereof connected to said shaft to drive the same, a hydraulic transmission including a pump driven by said engine and a motor energized by said pump for driving said shaft, means for varying the displacement of said motor between a predetermined minimum and maximum in accordance with variations in the torque of said motor, means for adjusting said mechanical transmission to connect or disconnect the two parts thereof and thereby render said mechanical transmission effective or ineffective to drive said shaft, other means independent of said displacement varying means for rendering said hydraulic transmission effective or ineffective to drive said shaft, and means for effecting substantially simultaneous operation of said adjusting means and said other means to thereby render one transmission effective and the other transmission ineffective to drive said shaft.

2. In a drive for transmitting motion from an engine to a shaft, the combination of a mechanical transmission having one part thereof driven by said engine and another part thereof connected to said shaft to drive the same, a hydraulic transmission including a pump driven by said engine and a motor energized by said pump for driving said shaft, means for varying the displacement of said motor between a predetermined minimum and maximum in accordance with variations in the torque of said motor, means for adjusting said mechanical transmission to connect or disconnect the two parts thereof and thereby render said mechanical transmission effective or ineffective to drive said shaft, other means independent of said displacement varying means for rendering said hydraulic transmission effective or ineffective to drive said shaft, means for effecting substantially simultaneous operation of said adjusting means and said other means to thereby render one transmission effective and the other transmission ineffective to drive said shaft, and means for reversing said motor.

3. In a drive for transmitting motion from an engine to a shaft, the combination of a mechanical transmission having one part thereof driven by said engine and another part thereof connected to said shaft to drive the same, a hydraulic transmission including a pump driven by said engine and a motor energized by said pump for driving said shaft, means for adjusting said mechanical transmission to connect or disconnect the two parts thereof and thereby render said mechanical transmission effective or ineffective to drive said shaft, a valve for bypassing at least a part of the liquid discharged by said pump to thereby render said hydraulic transmission ineffective to drive said shaft, means for effecting substantially simultaneous operation of said adjusting means and said valve to thereby render one transmission effective and the other transmission ineffective to drive said shaft, and means for reversing said motor.

4. In a drive for transmitting motion from an engine to a shaft, the combination of a mechanical transmission having one part thereof driven by said engine and another part thereof connected to said shaft to drive the same, a hydraulic transmission including a pump driven by said engine and a motor energized by said pump for driving said shaft, means for varying the displacement of said motor between a predetermined minimum and maximum in accordance with variations in the torque of said motor, means for adjusting said mechanical transmission to connect or disconnect the two parts thereof and thereby render said mechanical transmission effective or ineffective to drive said shaft, a valve for bypassing at least a part of the liquid discharged by said pump to thereby render said hydraulic transmission ineffective to drive said shaft, and means for effecting substantially simultaneous operation of said adjusting means and said valve to thereby render one transmission effective and the other transmission ineffective to drive said shaft.

5. In a drive for transmitting motion from an engine to a shaft, the combination of a mechanical transmission having one part thereof driven by said engine and another part thereof connected to said shaft to drive the same, a hydraulic transmission including a pump driven by said engine and a motor energized by said pump for driving said shaft, means for adjusting said mechanical transmission to connect or disconnect the two parts thereof and thereby render said mechanical transmission effective or ineffective to drive said shaft, other means for rendering said hydraulic transmission effective or ineffective to drive said shaft, means for operating said other means to thereby render said hydraulic transmission effective to drive said shaft, means for effecting substantially simultaneous operation of said adjusting means and said other means to thereby render said mechanical transmission effective and said hydraulic transmission ineffective to drive said shaft, means for controlling said last mentioned means, and means responsive to variations in engine torque for preventing said controlling means from functioning until a substantial torque is being transmitted through said drive.

6. In a drive for transmitting motion from an engine to a shaft, the combination of a mechanical transmission having one part thereof driven by said engine and another part thereof connected to said shaft to drive the same, a hydraulic transmission including a pump driven by said engine and a motor energized by said pump for driving said shaft, means for adjusting said mechanical transmission to connect or disconnect the two parts thereof and thereby render said mechanical transmission effective or ineffective to drive said shaft, a valve for bypassing at least a part of the liquid discharged by said pump to thereby render said hydraulic transmission ineffective to drive said shaft, means for operating said valve to thereby render said hydraulic transmission effective to drive said shaft, means for effecting substantially simultaneous operation of said adjusting means and said valve to thereby render said mechanical transmission effective and said hydraulic transmission ineffective to drive said shaft, means for controlling said last mentioned means, and means responsive to variations in engine torque for preventing said controlling means from functioning until a substantial torque is being transmitted through said drive.

7. In a drive for transmitting motion from an engine to a shaft, the combination of a mechanical transmission having one part thereof driven by said engine and another part thereof connected to said shaft to drive the same, a hydraulic transmission including a pump driven by said engine and a motor energized by said pump for driving said shaft, means for varying the displacement of said motor between a predetermined minimum and maximum in accordance with variations in the torque of said motor, means for adjusting said mechanical transmission to connect or disconnect the two parts thereof and thereby render said mechanical transmission effective or ineffective to drive said shaft, other means for rendering said hydraulic transmission effective or ineffective to drive said shaft, means for operating said other means to thereby render said hydraulic transmission effective to drive said shaft, means for effecting substantially simultaneous operation of said adjusting means and said other means to thereby render said mechanical transmission effective and said hydraulic transmission ineffective to drive said shaft, means for controlling said last mentioned means, and means responsive to variations in engine torque for preventing said controlling means from functioning until a substantial torque is being transmitted through said drive.

8. In a drive for transmitting motion from an engine to a shaft, the combination of a mechanical transmission having one part thereof driven by said engine and another part thereof connected to said shaft to drive the same, a hydraulic transmission including a pump driven by said engine and a motor energized by said pump for driving said shaft, means for varying the displacement of said motor between a predetermined minimum and maximum in accordance with variations in the torque of said motor, means for adjusting said mechanical transmission to connect or disconnect the two parts thereof and thereby render said mechanical transmission effective or ineffective to drive said shaft, other means independent of said displacement varying means for rendering said hydraulic transmission effective or ineffective to drive said shaft, means for operating said other means to thereby render said hydraulic transmission effective to drive said shaft, and means including means responsive to the displacement of said motor being reduced to said predetermined minimum for effecting substantially simultaneous operation of said adjusting means and said other means to thereby render said mechanical transmission effective and said hydraulic transmission ineffective to drive said shaft.

9. In a drive for transmitting motion from an engine to a shaft, the combination of a mechanical transmission having one part thereof driven by said engine and another part thereof connected to said shaft to drive the same, a hydraulic transmission including a pump driven by said engine and a motor energized by said pump for driving said shaft, means for varying the displacement of said motor between a predetermined minimum and maximum in accordance with variations in the torque of said motor, means for adjusting said mechanical transmission to connect or disconnect the two parts thereof and thereby render said mechanical transmission effective or ineffective to drive said shaft, other means for rendering said hydraulic transmission effective or ineffective to drive said shaft, means for actuating said other means to thereby render said hydraulic transmission effective to drive said shaft, operating means adapted when effective to cause substantially simultaneous operation of said adjusting means and said other means to thereby render said mechanical transmission effective and said hydraulic transmission ineffective to drive said shaft, means for controlling said operating means to render the same effective or ineffective, means responsive to the displacement of said motor being reduced to said predetermined minimum for causing said controlling means to render said operating means effective, and means responsive to variations in engine torque for preventing said controlling means from causing said operating means to become effective until a substantial torque is being transmitted through said drive.

10. In a drive for transmitting motion from an engine to a shaft, the combination of a mechanical transmission having one part thereof driven by said engine and another part thereof connected to said shaft to drive the same, a hydraulic transmission including a pump driven by said engine and a motor energized by said pump for driving said shaft, means for varying the displacement of said motor between a predetermined minimum and maximum in accordance with variations in the torque of said motor, means for adjusting said mechanical transmission to connect or disconnect the two parts thereof and thereby render said mechanical transmission effective or ineffective to drive said shaft, a valve for bypassing at least a part of the liquid discharged by said pump to thereby render said hydraulic transmission ineffective to drive said shaft, means for operating said valve to thereby render said hydraulic transmission effective to drive said shaft, and means including means responsive to the displacement of said motor being reduced to said predetermined minimum for effecting substantially simultaneous operation of said adjusting means and said valve to thereby render said mechanical transmission effective and said hydraulic transmission ineffective to drive said shaft.

11. In a drive for transmitting motion from an engine to a shaft, the combination of a mechanical transmission having one part thereof driven by said engine and another part thereof connected to said shaft to drive the same, a hydraulic transmission including a pump driven by said engine and a motor energized by said pump for driving said shaft, means for varying the displacement of said motor between a predetermined minimum and maximum in accordance with variations in the torque of said motor, means for adjusting said mechanical transmission to connect or disconnect the two parts thereof and thereby render said mechanical transmission effective or ineffective to drive said shaft, a valve for bypassing at least a part of the liquid discharged by said pump to thereby render said hydraulic transmission ineffective to drive said shaft, means for actuating said valve to thereby render said hydraulic transmission effective to drive said shaft, operating means adapted when effective to cause substantially simultaneous operation of said adjusting means and said valve to thereby render said mechanical transmission effective and said hydraulic transmission ineffective to drive said shaft, and control means for rendering said operating means effective or ineffective and including means for preventing said control means from causing said operating means to become effective until the displacement of said motor has been reduced to said predetermined minimum and means responsive to variations in engine torque for preventing said control means from causing said operating means to become effective until a substantial torque is being transmitted through said drive.

12. In a drive for transmitting motion from the engine of a vehicle to the propeller shaft thereof, the combination of a mechanical transmission and a hydraulic transmission for selectively transmitting power from said engine to said shaft, means for rendering one transmission effective and the other transmission ineffective to transmit power to said shaft, control means for controlling said last mentioned means and including means for delaying the action of said control means until said delaying means is operated, and a torque measuring device connected between said transmissions and said engine and adapted to yield and effect operation of said delaying means in response to the torque transmitted through said device increasing to a given value.

13. In a drive for transmitting motion from the engine of a vehicle to the propeller shaft thereof, the combination of a mechanical transmission and a hydraulic transmission for selectively transmitting power from said engine to said shaft, control means for rendering one transmission effective and the other transmission ineffective to transmit power to said shaft and including means adapted when operated to cause said control means to render the currently effective transmission ineffective and the currently ineffective transmission effective to drive said shaft, and a torque measuring device connected between said transmissions and said engine and adapted to yield and effect operation of said last mentioned means in response to the torque transmitted through said device increasing to a predetermined value.

14. In a drive for transmitting motion from an engine to a shaft, the combination of a mechanical transmission having one part thereof driven by said engine and another part thereof connected to said shaft to drive the same, a hydraulic transmission including a pump driven by said engine and a motor energized by said pump for driving said shaft, means for varying the displacement of said motor between a predetermined minimum and maximum in accordance with variations in the torque of said motor, means for adjusting said mechanical transmission to connect or disconnect the two parts thereof and thereby render said mechanical transmission effective or ineffective to drive said shaft, other means for rendering said hydraulic transmission effective or ineffective to drive said shaft, means for effecting substantially simultaneous operation of said adjusting means and said other means to thereby render one transmission effective and the other transmission ineffective to drive said shaft, and means responsive to the torque transmitted through said mechanical transmission reaching a predetermined maximum for effecting operation of said last mentioned means to thereby render said hydraulic transmission effective and said mechanical transmission ineffective to drive said shaft.

15. In a drive for transmitting motion from an engine to a shaft, the combination of a mechanical transmission having one part thereof driven by said engine and another part thereof connected to said shaft to drive the same, a hydraulic transmission including a pump driven by said engine and a motor energized by said pump for driving said shaft, both of said transmissions being normally ineffective to drive said shaft, means for varying the displacement of said motor between a predetermined minimum and maximum in accordance with variations in the torque of said motor, adjusting means adapted when effective to render said mechanical transmission effective to drive said shaft, other means adapted when effective to render said hydraulic transmission effective to drive said shaft, means for rendering said other means effective, means for thereafter substantially simultaneously rendering said adjusting means effective and said other means ineffective to thereby render said mechanical transmission effective and said hydraulic transmission ineffective to drive said shaft only after a substantial torque is being transmitted through said drive, said means responsive to the torque transmitted through said mechanical transmission reaching a predetermined maximum for rendering said other means effective and said adjusting means ineffective to thereby render said hydraulic transmission effective and said mechanical transmission ineffective to drive said shaft.

16. In a drive for transmitting motion from an engine to a shaft, the combination of a mechanical transmission having one part thereof driven by said engine and another part thereof connected to said shaft to drive the same, a hydraulic transmission including a pump driven by said engine and a motor energized by said pump for driving said shaft, means for varying the displacement of said motor between a predetermined minimum and maximum in accordance with variations in the torque of said motor, means for adjusting said mechanical transmission to connect or disconnect the two parts thereof and thereby render said mechanical transmission effective or ineffective to drive said shaft, other means for rendering said hydraulic transmission effective or ineffective to drive said shaft, means for varying the displacement of said pump to thereby vary the speeds of said motor and said shaft relative to the speed of said engine, means responsive to a variation in the relative speeds of said shaft and said engine for operating said displacement varying means to thereby cause said motor to drive said shaft at a speed proportional to the speed of said engine, means for adjusting said speed responsive means to regulate the speed of said shaft relative to the speed of said engine and thereby cause the speeds of the two parts of said mechanical transmission to be synchronized, and means responsive to the displacement of said motor being reduced to said predetermined minimum for effecting substantially simultaneous operation of said transmission adjusting means and said other means to thereby render said mechanical transmission effective and said hydraulic transmission ineffective to drive said shaft.

17. In a drive for transmitting motion from an engine to a shaft, the combination of a mechanical transmission having one part thereof driven by said engine and another part thereof connected to said shaft to drive the same, a hydraulic transmission including a pump driven by said engine and a motor energized by said pump for driving said shaft, means for adjusting said mechanical transmission to connect or disconnect the two parts thereof and thereby render said mechanical transmission effective or ineffective to drive said shaft, other means for rendering said hydraulic transmission effective or ineffective to drive said shaft, means for varying the displacement of said pump to thereby vary the speed of said motor and said shaft relative to the speed of said engine, means responsive to a variation in the relative speeds of said shaft and said engine for operating said displacement varying means to thereby cause said motor to drive said shaft at a speed proportional to the speed of said engine, means for adjusting said speed responsive means to regulate the speed of said shaft relative to the speed of said engine and thereby cause the speeds of the two parts of said mechanical transmission to be synchronized, means for effecting substantially simultaneous operation of said transmission adjusting means and said other means to thereby render one transmission effective and the other transmission ineffective to drive said shaft, means for controlling said last mentioned means, and means responsive to variations in torque for preventing said control means from functioning to render said mechanical transmission effective and said hydraulic transmission ineffective to drive said shaft until a substantial torque is being transmitted through said drive.

18. In a drive for transmitting motion from an engine to a shaft, the combination of a mechanical transmission having one part thereof driven by said engine and another part thereof connected to said shaft to drive the same, a hydraulic transmission including a pump driven by said engine and a motor energized by said pump for driving said shaft, means for varying the displacement of said motor between a predetermined minimum and maximum in accordance with variations in the torque of said motor, means for adjusting said mechanical transmission to connect or disconnect the two parts thereof and thereby render said mechanical transmission effective or ineffective to drive said shaft, other means for rendering said hydraulic transmission effective or ineffective to drive said shaft, means for varying the displacement of said pump to thereby vary the speeds of said motor and said shaft relative to the speed of said engine, means responsive to a variation in the relative speeds of said shaft and said engine for operating said displacement varying means to thereby cause said motor to drive said shaft at a speed proportional to the speed of said engine, means for adjusting said speed responsive means to regulate the speed of said shaft relative to the speed of said engine and thereby cause the speeds of the two parts of said mechanical transmission to be synchronized, control means for effecting substantially simultaneous operation of said transmission adjusting means and said other means to thereby render one transmission effective and the other transmission ineffective to drive said shaft, and means responsive to the torque transmitted through said mechanical transmission reaching a predetermined maximum for effecting operation of said control means to thereby render said hydraulic transmission effective and said mechanical transmission ineffective to drive said shaft.

19. In a drive for transmitting motion from an engine to a shaft, the combination of a mechanical transmission having one part thereof driven by said engine and another part thereof connected to said shaft to drive the same, a hydraulic transmission including a pump driven by said engine and a motor energized by said pump for driving said shaft, means for varying the displacement of said motor between a predetermined minimum and maximum in accordance with variations in the torque of said motor, means for adjusting said mechanical transmission to connect or disconnect the two parts thereof and thereby render said mechanical transmission effective or ineffective to drive said shaft, other means for rendering said hydraulic transmission effective or ineffective to drive said shaft, means for varying the displacement of said pump to thereby vary the speeds of said motor and said shaft relative to the speed of said engine, means responsive to a variation in the relative speeds of said shaft and said engine for operating said displacement varying means to thereby cause said motor to drive said shaft at a speed proportional to the speed of said engine, means for adjusting said speed responsive means to regulate the speed of said shaft relative to the speed of said engine and thereby cause the speeds of the two parts of said mechanical transmission to be synchronized, means for effecting substantially simultaneous operation of said transmission adjusting means and said other means to thereby render one transmission effective and the other transmission ineffective to drive said shaft, means for controlling said last mentioned means, means responsive to variations in torque for preventing said control means from functioning to render said mechanical transmission effective and said hydraulic transmission ineffective to drive said shaft until a substantial torque is being transmitted through said drive, and means responsive to the torque transmitted through said mechanical transmission reaching a predetermined maximum for effecting operation of said control means to thereby render said hydraulic transmission effective and said mechanical transmission ineffective to drive said shaft.

20. In a drive for transmitting motion from a prime mover to a shaft, the combination of a mechanical transmission provided with an overrunning clutch having the driving part thereof connected to and driven by said prime mover and means for connecting the driven part of said clutch to said shaft to provide a direct drive from said prime mover to said shaft through said clutch and said connecting means, a hydraulic transmission including a pump driven by said prime mover and a hydraulic motor energized by said pump and connected to said shaft to drive the same, means for adjusting said pump to vary the displacement thereof and thereby vary the speed of said shaft relative to the speed of said prime mover, means for adjusting said motor to vary the displacement thereof between a predetermined minimum and maximum in response to variations in motor torque, said pump and motor being so proportioned that said motor will drive said shaft at a speed slightly greater than the speed of said prime mover when the displacement of said pump is maximum and the displacement of said motor is at said predetermined minimum, means for rendering said hydraulic transmission ineffective to drive said shaft, and means responsive to the displacement of said motor being reduced to said predetermined minimum for operating the last mentioned means and said connecting means substantially simultaneously.

WALTER FERRIS.